United States Patent [19]

Tinsley et al.

[11] Patent Number: 5,064,990
[45] Date of Patent: Nov. 12, 1991

[54] PROCESSING OF METAL ARTICLES

[75] Inventors: Michael Tinsley, Leeds; Antony Johns, Guiseley; Jonathan D. Philby, Burley-in-Wharfedale, all of England

[73] Assignee: AE Turbine Components Limited, Leeds, England

[21] Appl. No.: 451,161

[22] Filed: Dec. 15, 1989

[30] Foreign Application Priority Data

Dec. 21, 1988 [GB] United Kingdom ............... 8829818

[51] Int. Cl.⁵ ............................................. B23K 26/00
[52] U.S. Cl. .............................. 219/121.72; 219/121.78
[58] Field of Search ................. 219/121.67, 121.72, 219/121.6, 121.85, 121.78, 121.82

[56] References Cited

U.S. PATENT DOCUMENTS 4,100,393  7/1978  Luther .................. 219/121.69 X
4,870,244  9/1989  Copley et al. ............. 219/121.7

FOREIGN PATENT DOCUMENTS 0060980  9/1982  European Pat. Off. .
2342807  9/1977  France .
202824  10/1983  German Democratic Rep. .
58-151981  9/1983  Japan .
61-286087  5/1986  Japan .
1523494  9/1978  United Kingdom .
2154017  8/1985  United Kingdom .
2185206  7/1987  United Kingdom .

OTHER PUBLICATIONS

Patent Abstracts of Japan, vol. 5, No. 203 (M-103), Dec. 23, 1981; and JP-A-56 119 371 (Toshiba Corp.) 09/18/1981.
Technica, vol. 10, 1984, pp. 80-86, Zurich, CH; K. Herbert: "Trennverfahren fur dunne Bleche," and translation of pp. 83-86.
Laser und Optoelektronik, vol. 1, No. 3, Sep. 1985, pp. 282-290, Stuttgart, DE; E. Beyer et al.: "Schneiden mit Laserstrahlung," and translation og pp. 283-284.

Primary Examiner—C. L. Albritton
Attorney, Agent, or Firm—William R. Hinds

[57] ABSTRACT

A method is described for the separation of metal articles from surplus metal by the use of a laser. The articles may be cast or wrought. Several examples are given of gas turbine engine components being separated from a gating system by the use of a YAG laser. Benefits include lack of heat generation and, therefore, little or no distortion in the article.

13 Claims, 4 Drawing Sheets

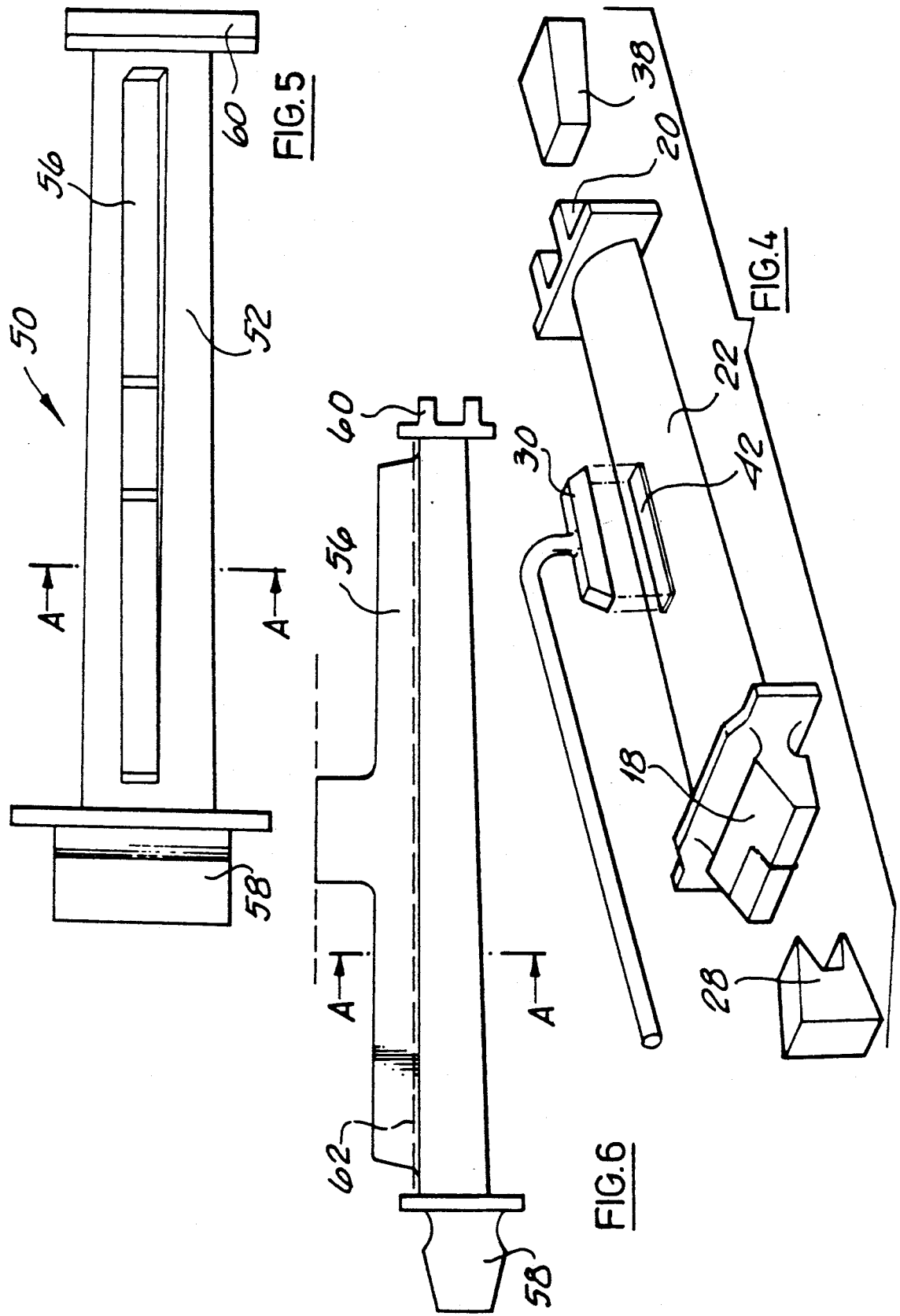

PROCESSING OF METAL ARTICLES

The present invention relates to the processing of metal articles for the removal of waste metal.

When metal components are cast, for example, there is frequently a complex system of feeders and runners, known as the gating system, which is used in an attempt to ensure that solidifying metal in the actual article being cast is adequately supplied with liquid metal in order to prevent or limit shrinkage porosity. Such feeders and runners are usually cut off by saws, abrasive slitting wheels or by other mechanical means.

Similar circumstances may arise in the case of wrought articles where surplus metal may need to be removed. The "flash" on a forged article is a typical example.

Where the articles being cast or forged are components such as blades and nozzle guide vane (NGV) segments for gas turbine engines, for example, abrasive slitting wheels are normally employed to remove the bulk of the waste metal as close as possible to the article surface; the residual waste being removed by abrasive-belt grinding.

Turbine engine components are generally made by forging or by investment casting from expensive alloys and the slitting and grinding operations generate a lot of particulate debris which has no recovery value and pollutes the environment.

There is a high consumables cost in the form of slitting wheels, abrasive-belts and waste metal whilst the operations themselves are labour intensive and dangerous.

Technical disadvantages include detrimental metallurgical effects on the component alloys due to deformation and high heat generation during abrasive cutting and grinding. This is especially serious in the case of directionally solidified (DS) and single crystal (SX) components where "stray" grains may be nucleated due to local deformation and heat. Many components include thin and relatively delicate airfoils which may become deformed and cracked due to the high grinding forces and resultant thermal stresses.

When conventional cut-off methods are used to remove feeder gates from concave surfaces, e.g. on the inner diameter of an NGV segment, a substantial amount of surplus material is of necessity left on. Subsequent removal of this material by abrasive belt machining is difficult. Electro discharge machining (EDM) techniques may be used in such instances but the techniques are slow and expensive.

It is an object of the present invention to provide a method for removing surplus metal from an article without the disadvantages described above.

According to the present invention a method is provided for removing surplus metal from a cast or wrought article formed from a metal selected from the group comprising aluminium alloys, titanium alloys, nickel alloys, cobalt alloys and iron alloys, the method being characterised by comprising the steps of severing the surplus metal from the article in solid pieces by means of a laser beam from a YAG laser and leaving a thickness of residual surplus metal on the article which thickness is greater than the thickness of a heat affected layer remaining after the laser severing step.

Usually, in the case of cast blades and NGV segments for turbines, several articles are cast simultaneously in a "cluster" which has a common gating system for the articles. Some larger articles such as, for example, a complete NGV ring may be cast singly. Nevertheless such single articles are invariably associated with a complex gating system which needs to be removed.

Ideally it is desirable to minimise the number of cuts required to separate an article from its cluster or gating system. In this regard it is desirable to make all cuts adjacent the article surface such that only final polishing is required. Because of geometrical limitations inherent with some designs of article or cluster this may not always be possible. It is, therefore, acknowledged that in some instances it may be necessary to separate the article by cuts which leave substantial amounts of the surplus metal attached to the article. These cuts may be made remote from the critical areas of the article and may alternatively be made by techniques other than laser. Even where these first or "rough" cuts are made by abrasive slitting wheels, for example, there is nevertheless a substantial advantage gained. This is because the rough cuts may be made in any convenient position merely to release an article from the bulk of the gating system of surplus metal. No heed need be given to leaving the minimum amount of residual metal attached since this will be removed by laser, generally as a single piece, and not by abrasive grinding methods.

Where components such as blades are produced by forging from solid stock there is invariably a waste metal "flash" left around the periphery of the article. Such flash is usually removed by abrasive grinding; the actual profile of the article often being imparted during the process. Where a laser is used to remove the flash; the article profile may be accurately formed by appropriate handling means.

The radiation emitted by a YAG laser couples more effectively with metals than does that from a $CO_2$ laser. To achieve a comparable cutting rate a $CO_2$ laser would need a much higher mean power than does a YAG laser. A YAG laser normally operates in the pulsed mode to give a high peak to average power ration; also the low divergence of the beam permits it to be focussed to a small spot size. Both these factors produce a higher power density at the workpiece which leads to more effective cutting. For comparable cutting rates a YAG laser has been found to produce a much cleaner cut, than a $CO_2$ laser which means that less surplus material need be left on the component for subsequent removal. We have found that a cut produced by $CO_2$ laser leaves a rough surface which undulates by 1 to 2 mm whereas a YAG laser cut is flat to within 0.1 to 0.2 mm.

When removing the gating system from turbine components, a principal consideration is how thick is the heat affected layer produced by the laser beam. The heat affected layer comprises a "recast" layer and a layer which is affected by surface cracking due to fusion by the laser. The "recast" layer is the layer of melted material which has resolidified on the surface whilst the surface cracks are caused by shrinkage during resolidification of the recast layer and they may extend through the recast layer into the parent material below. We have found that, in the case of the nickel-based alloy IN 100 (trade mark) for example, the maximum heat affected layer depth, which includes the recast layer and any cracking, is 0.075 mm over a wide range of laser cutting speeds for 9 mm thick material. It is therefore, entirely feasible to remove gating systems from components using laser cuts leaving approximately 0.5 mm or less, in the interests of establishing a generous safety margin, of surplus material on the component for subsequent removal by polishing. It must be emphasized that some materials are more prone to cracking than IN 100 whilst other materials are less so; thus the 0.5 mm safety margin may be modified in either direction according to the material in question. It must also be emphasized, however, that whatever the tendency of the material to cracking, that produced by laser cutting is invariably less in magnitude and extent than that produced by the conventional methods of abrasive slitting followed by large scale abrasive belt grinding. It may be said that most materials will be safely encompassed by an upper limit of 1 mm of residual surplus metal remaining on the component.

In general laser cutting should be undertaken at the maximum traverse speed consistent with complete and reliable penetration of the material being cut.

Preferably, the thickness of residual surplus metal remaining on the article may lie in the range from two times to fifteen times the maximum thickness of the heat affected layer produced by the laser severing operation. More preferably, the residual layer thickness may lie in the range from four to ten times the heat affected layer thickness.

A further advantage of a YAG laser is that radiation from a YAG laser, in contrast to that from a $CO_2$ laser, may be transmitted along fibre optics with a minimum of power loss. This can give much more flexibility in machine design, where provision has to be made for delivering power from the laser to the cutting point. It also provides the opportunity for "ganging" the outputs of two or more lasers to increase power at the cutting point.

Preferably, the laser cut-off means is allied to an automated mechanical handling system. The handling system may include a robot or manipulator. The workpiece or the laser cutting head or both may be moved during cutting.

Curves and shapes may easily be cut whereas the prior art method using slitting wheels was limited to straight cuts, which invariably result in substantially larger amounts of surplus material being left for subsequent removal by abrasive belt machining. This in turn leads to an increased yield of recoverable scrap material.

In the case of cast articles the ability of a laser cut-off system to cope with a wider variety of gating systems and at the same time avoid the need for subsequent removal, by abrasive means, of substantial amounts of residual metal, gives the casting engineer more scope to optimise the cluster design from the point of view of soundness of the cast articles and reduces the compromises which need to be made in recognition of cut-off requirements. The corollary to this is that since much more complex gating systems may now be easily removed, the component designer is given more design freedom to optimise the component itself for the application.

The method is inherently much safer than prior art methods and its amenability to automation by robotic handling of the articles enhances the economic benefits derived from the inventive process.

Most blades and NGV segments, for example, are cast in clusters around a common feeding and gating system. The clusters are conventionally designed to be split by an abrasive slitting wheel. An advantage of using the method of the present invention is that such clusters may be designed to accommodate increased numbers of articles thus reducing the unit cost.

In order that the present invention may be more fully understood examples will now be described by way of illustration only with reference to the accompanying drawings, of which;

FIG. 4 shows the blade of FIGS. 2 and 3 with the feeder and end gates removed;

FIG. 5 shows a plan view of a blade having a full length gate on the airfoil;

FIG. 6 shows the blade of FIG. 5 in elevation;

Figure 10:
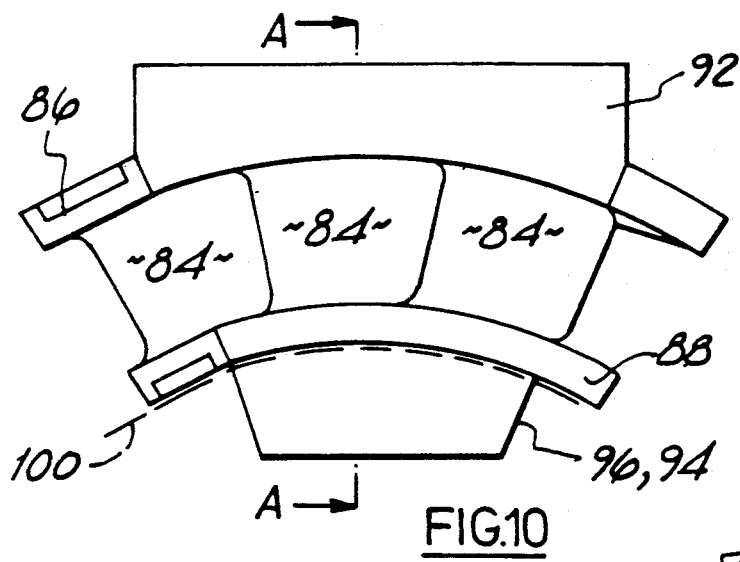
FIG. 10 shows an NGV segment cut from the cluster of FIG. 9.
Figure 12:
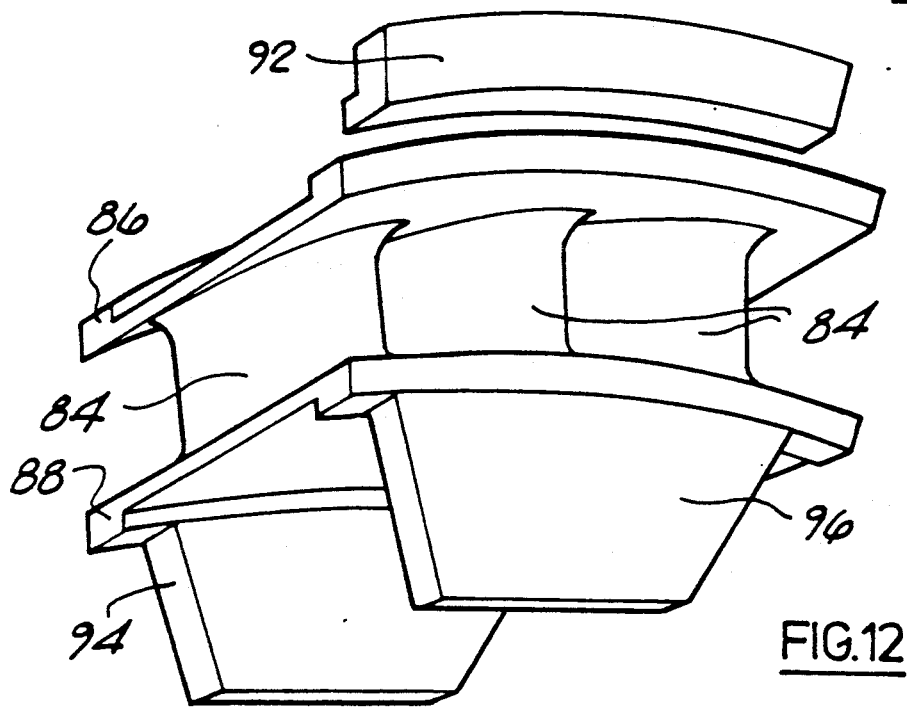

FIG. 12 which shows the NGV segment of FIG. 10 with the gates removed.

Figure 1:
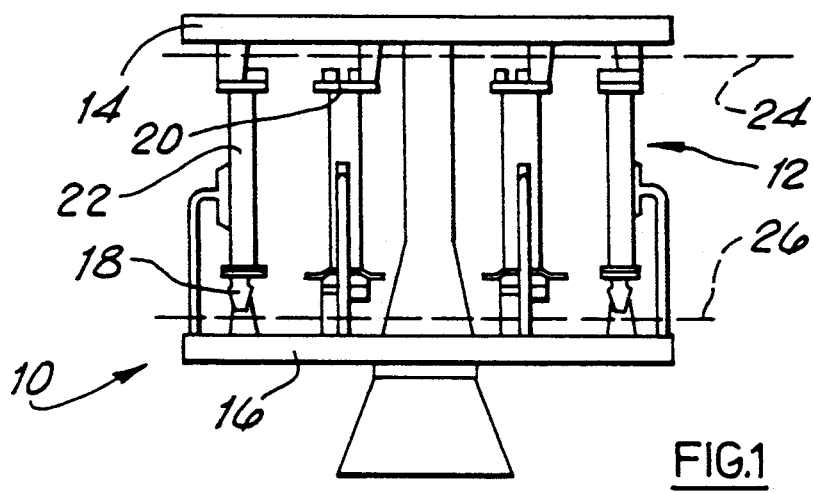
FIG. 1 shows an elevation of a conventional cluster of turbine blades after removal of the mould shell.
Figure 2:
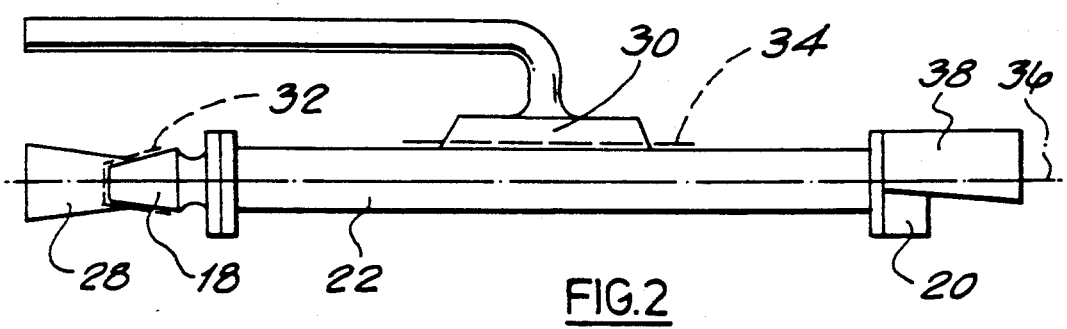
FIG. 2 shows a blade removed from the cluster of FIG. 1 and having the airfoil feeder and root end gate removed.
Figure 3:
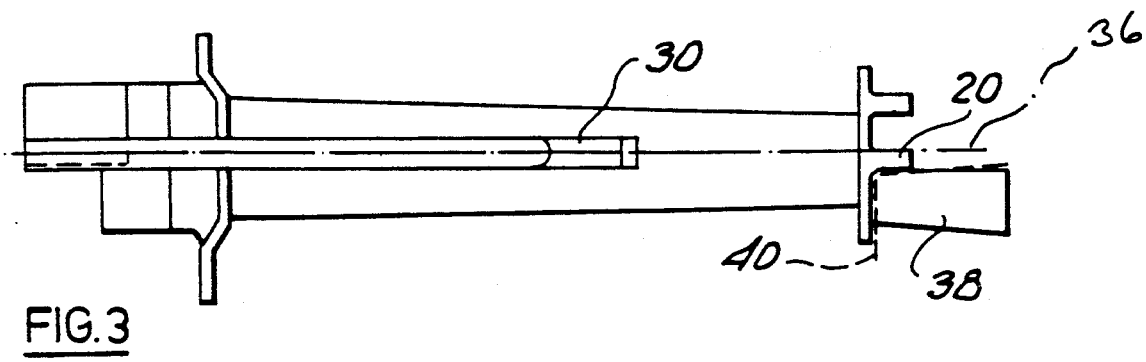
FIG. 3 shows the blade of FIG. 2 having the tip end gate removed.
Figure 8:
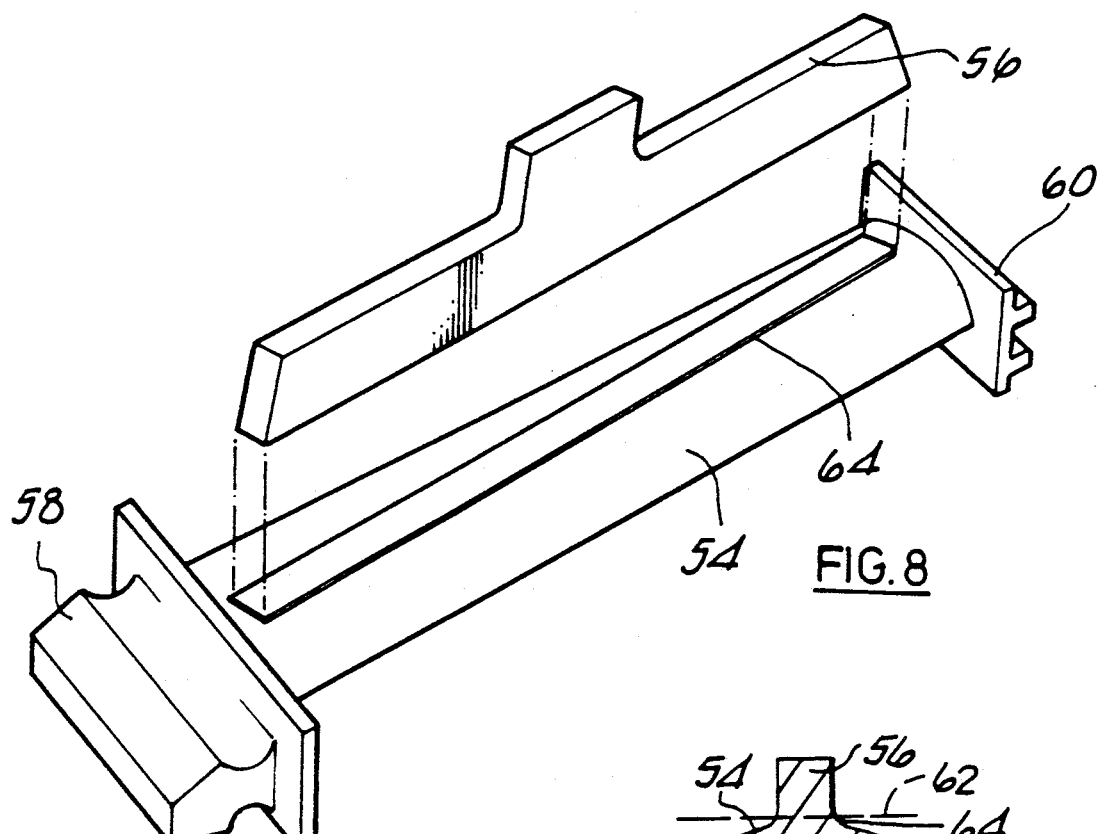
FIG. 8 shows a perspective view of the blade of FIGS. 5, 6 and 7 with the gate removed.
Figure 7:
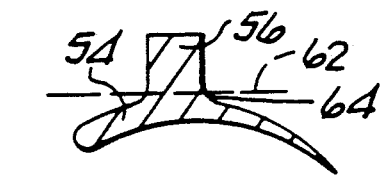
FIG. 7 shows a section on the line AA of FIG. 6.

Referring now to FIGS. 1 to 4 and where the same features are denoted by common reference numerals. A cluster is denoted generally at 10 and comprises several articles 12, in this case turbine blades which have metal feed runners 14, 16 to the root block end 18, tip block end 20 and to the airfoil 22. The blades are removed from the cluster 10 by cutting with a YAG laser along planes indicated by the dashed lines 24, 26. The removed blade still has surplus metal attached thereto. In FIG. 2 the root end gate 28 and airfoil gate 30 are removed by cutting along dashed lines 32 and 34 respectively. The blade is then rotated through approximately 90° about its axis 36 (FIG. 3) and the tip end gate 38 is removed by cutting along the dashed line 40. Only a relatively small amount of residual metal 42 remains to be removed from the airfoil by relatively gentle polising techniques. Cutting rates for nickel-based superalloys have been established at 80 mm per min for 6 mm thick material, 60 mm per min for 8 mm thick material and 25 mm per min for 13 mm thick material. These cutting rates have been achieved with a nominal 400 W YAG laser operating at a power density of 50 $GW/m^2$ and a spot size of 0.7 mm diameter.

Tests were conducted on IN 100 (trade mark) material of 9 mm thickness at various cutting speeds, the depth of cracking and the thickness of the recast layer being measured on samples at each speed. All speeds allowed complete and reliable penetration of the 9 mm thick material. The results of the measurements are given in the Table below:

| CUTTING SPEED (mm/min) | CRACKING MAXIMUM DEPTH (mm) | RECAST LAYER MAXIMUM THICKNESS (mm) |
|---|---|---|
| 53 | 0.018 | 0.008 |
| 48 | 0.05 | 0.013 |
| 44 | 0.075 | 0.033 |
| 40 | 0.063 | 0.025 |
| 38 | 0.025 | 0.035 |
| 35 | 0.05 | 0.025 |

It may be seen from the above figures that the maximum affected depth is 0.075 mm and that leaving a residual thickness in the region of 0.5 mm provides an adequate safety allowance.

A blade 50 having a long, thin-sectioned airfoil 52 with an axial twist is shown in FIGS. 5 to 8. Because of the airfoil length and thin section 54 this component ideally has a full length feeder 56 to limit or prevent the formation of shrinkage porosity in the airfoil during solidification. If the feeder 56 were to be removed by conventional abrasive grinding techniques, there is a high probability that unacceptable distortion and metallurgical damage to the airfoil would occur. The blade may be held in a fixture (not shown) between the root 58 and shroud end 60 and rotated during laser cutting along the dashed line 62 to accomodate the axial twist in the airfoil and leave a minimum of material 64 to be removed by final polishing of the airfoil.

Figure 9:
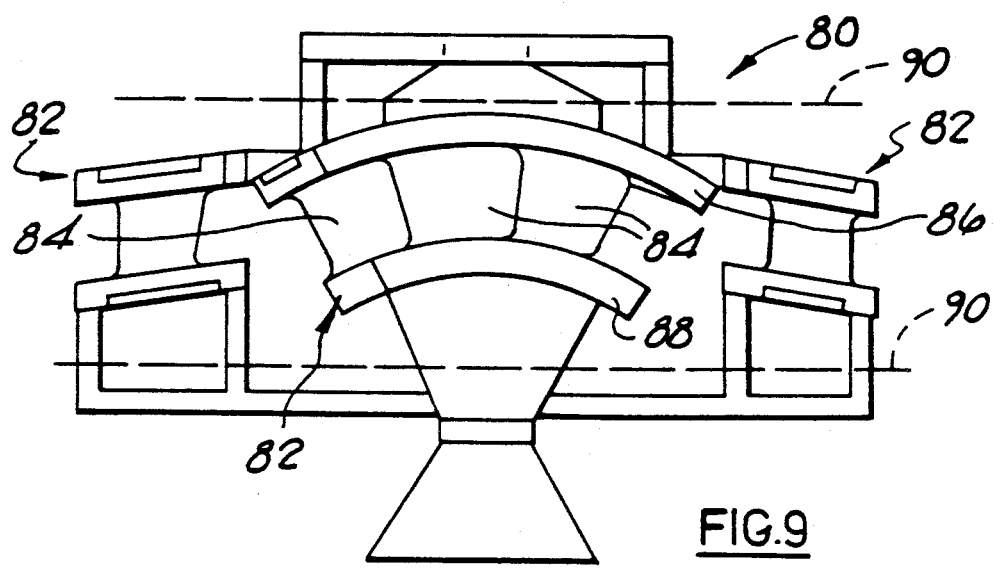
FIG. 9 shows an elevation view of a cluster of NGV segments.
Figure 11:
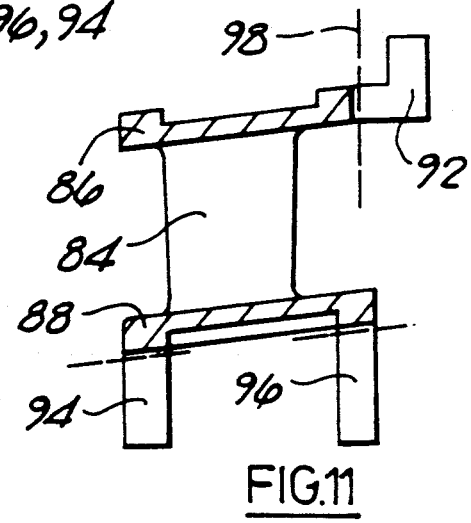
FIG. 11 shows a section on the line AA of FIG. 10.

A cluster 80 of NGV segments 82 is shown in FIG. 9 and an individual segment in FIGS. 10, 11 and 12. The segment 82 comprises three separate airfoils 84 connected by a curved outer member 86 and a curved inner member 88. A number of segments are joined together in an engine to form an NGV ring. The segment 82 is cut from the cluster 80 along the planes denoted by the dashed lines 90 to leave residual gating material 92, 94 and 96. The material 92 may be removed by a straight cut on the plane 98. The material 94, 96, however, lies on the inner curved surface and which is very difficult to remove by conventional abrasive means due to lack of access. By laser cutting means the material may easily be removed by cutting a curved profile on the dashed line 100. Furthermore, a curve cut by laser means does not need to be of circular form.

We claim:

1. A method for removing surplus metal from a cast or wrought article formed from a metal selected from the group comprising aluminium alloys, titanium alloys, nickel alloys, cobalt alloys and iron alloys, the method comprising the steps of severing said surplus metal from the article in solid pieces by means of a laser beam from a YAG laser and leaving a thickness of residual surplus metal on said article which thickness is greater than the thickness of a heat affected layer remaining after the laser severing step.

2. A method according to claim 1 wherein the thickness of said residual surplus metal lies in the range from two to fifteen times the thickness of said heat affected layer remaining.

3. A method according to claim 2 wherein said thickness of residual surplus metal lies in the range from four to ten times said thickness of said heat affected layer remaining.

4. A method according to claim 1 wherein said thickness of residual surplus metal is not greater than about 1 mm.

5. A method according to claim 4 wherein said thickness of residual surplus metal is not greater than about 0.5 mm.

6. A method according to claim 1 further including the step of first removing said article from a cluster of articles by laser means.

7. A method according to claim 1 wherein said article is manipulated.

8. A method according to claim 1 wherein said laser cutting means is manipulated.

9. A method according to claim 1 wherein the outputs of two or more YAG lasers are combined by fibre optic means.

10. A method according to claim 1 wherein said article is a turbine component.

11. A method according to claim 1 wherein said article and surplus metal is first cut from a cluster of articles by non-laser means.

12. A method according to claim 6 wherein said cluster is manipulated.

13. A method according to claim 6 wherein said laser cutting means is manipulated.

* * * * *